United States Patent
Kaneumi

(10) Patent No.: US 10,023,733 B2
(45) Date of Patent: Jul. 17, 2018

(54) AQUEOUS DISPERSION OF FLUORINE-CONTAINING COPOLYMER

(71) Applicant: Unimatec Co., Ltd., Tokyo (JP)

(72) Inventor: Yoshiyama Kaneumi, Ibaraki (JP)

(73) Assignee: Unimatec Co., Ltd., Tokyo (JP)

( * ) Notice: Subject to any disclaimer, the term of this patent is extended or adjusted under 35 U.S.C. 154(b) by 0 days.

(21) Appl. No.: 14/900,897

(22) PCT Filed: Jun. 11, 2014

(86) PCT No.: PCT/JP2014/065462
§ 371 (c)(1),
(2) Date: Dec. 22, 2015

(87) PCT Pub. No.: WO2014/208338
PCT Pub. Date: Dec. 31, 2014

(65) Prior Publication Data
US 2016/0185948 A1 Jun. 30, 2016

(30) Foreign Application Priority Data

Jun. 25, 2013 (JP) ................................. 2013-132251

(51) Int. Cl.
| | | |
|---|---|---|
| C08F 220/14 | (2006.01) | |
| C08L 33/16 | (2006.01) | |
| C08F 220/24 | (2006.01) | |
| C08F 220/34 | (2006.01) | |
| D06M 15/33 | (2006.01) | |
| C08F 2/22 | (2006.01) | |

(52) U.S. Cl.
CPC .............. C08L 33/16 (2013.01); C08F 2/22 (2013.01); C08F 220/24 (2013.01); C08F 220/34 (2013.01); D06M 15/33 (2013.01); C08L 2201/54 (2013.01)

(58) Field of Classification Search
CPC ..... C08F 220/24; C08L 2201/54; C08L 33/16
See application file for complete search history.

(56) References Cited

U.S. PATENT DOCUMENTS

| | | | |
|---|---|---|---|
| 4,525,423 A | 6/1985 | Lynn et al. | |
| 4,529,658 A | 7/1985 | Schwartz et al. | |
| 7,732,545 B2* | 6/2010 | Sagawa | C08F 220/24 |
| | | | 526/245 |
| 8,680,223 B2* | 3/2014 | Jin | C08F 220/10 |
| | | | 526/245 |
| 8,916,643 B2* | 12/2014 | Jin | C08F 220/10 |
| | | | 524/544 |
| 9,096,695 B2* | 8/2015 | Kaneumi | C08F 2/24 |
| 2003/0040568 A1* | 2/2003 | Furuta | D21H 21/16 |
| | | | 524/520 |
| 2006/0052516 A1 | 3/2006 | Sagawa et al. | |
| 2007/0232166 A1 | 10/2007 | Hayashi et al. | |
| 2008/0153978 A1* | 6/2008 | Samuels | C08F 14/18 |
| | | | 525/55 |
| 2009/0036706 A1 | 2/2009 | Murata et al. | |
| 2010/0224817 A1* | 9/2010 | Jin | C08F 220/10 |
| | | | 252/8.62 |
| 2010/0249312 A1 | 9/2010 | Jin et al. | |
| 2011/0086962 A1* | 4/2011 | Kaneumi | C08F 2/24 |
| | | | 524/376 |
| 2011/0257327 A1 | 10/2011 | Jin et al. | |
| 2016/0185948 A1* | 6/2016 | Kaneumi | C08F 2/22 |
| | | | 252/8.62 |

FOREIGN PATENT DOCUMENTS

| | | |
|---|---|---|
| EP | 2 208 770 A1 | 7/2010 |
| GB | 1 530 275 | 10/1978 |
| JP | 51-55500 | 5/1976 |
| JP | 59-98113 | 6/1984 |
| JP | 2004-262954 A | 9/2004 |
| JP | 2007-270378 A | 10/2007 |
| JP | 2011-162790 A1 | 4/2011 |
| KR | 10-2011-0055724 A | 5/2011 |
| WO | WO 02/31261 A1 | 4/2002 |
| WO | WO 2007/105633 A1 | 9/2007 |
| WO | WO 2009/047943 A1 | 4/2009 |
| WO | WO 2009/151038 A1 | 12/2009 |

OTHER PUBLICATIONS

International Report on Patentability and Written Opinion from corresponding PCT application No. PCT/JP2014/065462 dated Jan. 7, 2016 (6 pgs).
International Search Report from corresponding PCT application No. PCT/JP2014/065462 dated Aug. 12, 2014 (4 pgs).

* cited by examiner

*Primary Examiner* — Michael A Salvitti
(74) *Attorney, Agent, or Firm* — Brinks Gilson & Lione

(57) ABSTRACT

An aqueous dispersion of a fluorine-containing copolymer comprising, as copolymerization units, (A) a (meth)acrylate represented by $[CH_2=CHRCOO(NH)_rR_1NR_2R_3R_4]^+Y^-$, (B) a perfluoroalkylalkyl(meth)acrylate represented by $C_mF_{2m+1}C_pH_{2p}(NR'SO_2)_qOCOCR=CH_2$ or a polyfluoroalkylalkyl(meth)acrylate thereof, or a polyfluoroalkyl(meth)acrylate represented by $C_nF_{2n+1}(CH_2CF_2)_a(CF_2CF_2)_b(CH_2CH_2)_cOCOCR=CH_2$, (C) benzyl(meth)acrylate, (D) a fluorine-free polymerizable monomer other than components (A) and (C), and (E) a crosslinkable group-containing polymerizable monomer. The aqueous dispersion can improve the dispersion stability of an aqueous dispersion of a water- and oil-repellent when used as a water- and oil-repellent comprising the fluorine-containing copolymer as an active component.

8 Claims, No Drawings

AQUEOUS DISPERSION OF FLUORINE-CONTAINING COPOLYMER

RELATED APPLICATION

This application is a 35 U.S.C. § 371 national phase filing of International Patent Application No. PCT/JP2014/065462, filed Jun. 11, 2014, which claims priority under 35 U.S.C. § 119 to Japanese Patent Application No. 2013-132251, filed Jun. 25, 2013, the entire disclosure of which is hereby expressly incorporated by reference.

TECHNICAL FIELD

The present invention relates to an aqueous dispersion of a fluorine-containing copolymer. More particularly, the present invention relates to an aqueous dispersion of a fluorine-containing copolymer that has excellent chemical stability and can be effectively used as a water- and oil-repellent aqueous dispersion, and the like.

BACKGROUND ART

Appearance of water- and oil-repellency by fluorine-containing polymers is attributable to the low surface energy of fluorine atoms. In general, a fluorine-containing (meth)acrylate-based polymer is often used as an active component of water- and oil-repellent.

For performance appearance as a water- and oil-repellent, it is important that water- and oil-repellent particles in the working fluid are uniformly adsorbed to the fiber surface. The zeta (ζ) potential of the fiber surface generally has a negative (anionic) potential, regardless of the type of natural fiber or synthetic fiber. Accordingly, it is necessary that the water- and oil-repellent particles have a moderate positive (cationic) potential. Thereby, stable adsorption occurs on the fiber surface, and stable performance is exhibited.

In contrast, water- and oil-repellent particles having an overly high positive potential may lead to a phenomenon in which many water- and oil-repellent particles are selectively adsorbed at once to the fiber surface having a negative potential, resulting in unstable performance, and uniform adsorption of the water- and oil-repellent particles may be inhibited by repulsion, thereby reducing the performance. Therefore, in water- and oil-repellents used for the treatment of fiber and the like, controlling the surface potential of the water- and oil-repellent particles is also important from the viewpoint of obtaining stable processability.

In order to give a positive (cationic) potential to the particle surface, use of a cationic emulsifier is proposed. For example, Patent Document 1 proposes a process for preparing an aqueous dispersion, the process comprising subjecting a polyfluoroalkyl group-containing (meth)acrylate and a fluorine atom-free polymerizable monomer to an emulsification treatment in the presence of a polypropylene glycol-based compound and a cationic surfactant comprising a quaternary ammonium salt, followed by copolymerization in the presence of a polymerization initiator.

However, in the successive processing of fiber and the like, dyes, chemicals, and the like used in the previous process before dyeing serve as impurities, and they are brought into a processing bath and accumulated therein. Because these impurities are mostly hydrophilic anionic substances, they react with the cationic emulsifier, thereby leading to troubles due to coagulation and sedimentation of the water- and oil-repellent and causing a depression of water- and oil-repellency.

Further, from actual circumstances where various chemicals have been increasingly used in combination in recent years, corresponding to processing purpose of and processing target of fiber and the like, the compatibility of water- and oil-repellents with other chemicals used in combination, that is, chemical stability, is strongly demanded.

Patent Document 2 discloses a water repellent-, oil repellent-, and soil release-processed textile using a water- and oil-repellent and a soil release agent in combination. The soil release agent used herein is a fluorine-containing copolymer comprising a fluorine-based monomer and a hydrophilic group-containing monomer. As examples of the hydrophilic group-containing monomer, Patent Document 2 refers to monomers having an ionic group (i.e., a cationic group or an anionic group) and an unsaturated bond, such as 2-methacryloyloxyethyltrimethylammonium chloride and N,N,N-trimethyl-N-(2-hydroxy-3-methacryloyloxypropyl)ammonium chloride.

In the fluorine-containing copolymer for the soil release agent, the amount of the hydrophilic group-containing monomer is described to be 10 to 80% by weight, preferably 15 to 60% by weight, for example 20 to 50% by weight, based on the total weight of the fluorine-based monomer and the hydrophilic group-containing monomer. In Synthesis Example 2, which shows an example of synthesizing a soil release agent, the following components are used:

| | |
|---|---|
| Perfluorooctylethyl acrylate | 60 g (60 wt. %) |
| Methoxypolyethyleneglycol methacrylate | 30 g (30 wt. %) |
| 2-Hydroxyethyl methacrylate | 8 g (8 wt. %) |
| 2-Methacryloyloxyethyltrimethylammonium chloride | 2 g (2 wt. %) |

It is described that the constituents of the obtained copolymer were substantially equal to the composition of the charged monomers.

PRIOR ART DOCUMENTS

Patent Documents

Patent Document 1: JP-A-2004-262954
Patent Document 2: JP-A-2007-270378
Patent Document 3: WO 2007/105633

OUTLINE OF THE INVENTION

Problem to be Solved by the Invention

An object of the present invention is to provide an aqueous dispersion of a fluorine-containing copolymer that can improve the dispersion stability of an aqueous dispersion of a water- and oil-repellent when used as a water- and oil-repellent comprising the fluorine-containing copolymer as an active component.

Means for Solving the Problem

The object of the present invention can be attained using an aqueous dispersion of a fluorine-containing copolymer comprising, as copolymerization units, (A) a (meth)acrylate represented by the general formula:

  [I]

wherein R is a hydrogen atom or a methyl group; $R_1$ is a linear, branched, or alicyclic alkylene group having 1 to 30 carbon atoms or a phenylene group; $R_2$, $R_3$, and $R_4$ are the same or different and each is a linear, branched, or alicyclic alkyl group having 1 to 30 carbon atoms or an aralkyl group; r is 0 or 1; and $Y^-$ is an anionic group;

(B) a perfluoroalkylalkyl(meth)acrylate represented by the general formula:

$$C_mF_{2m+1}C_pH_{2p}(NR'SO_2)_qOCOCR=CH_2 \quad [IIa]$$

wherein R is a hydrogen atom or a methyl group, R' is an alkyl group having 1 to 5 carbon atoms, m is an integer of 4 to 14, p is an integer of 1 to 4, and q is 0 or 1;

a polyfluoroalkylalkyl(meth)acrylate which is prepared by replacing some of the fluorine atoms in the perfluoroalkyl group in the above perfluoroalkylalkyl(meth)acrylate with hydrogen atoms; or a polyfluoroalkyl(meth)acrylate represented by the general formula:

$$C_nF_{2n+1}(CH_2CF_2)_a(CF_2CF_2)_b(CH_2CH_2)_c \\ OCOCR=CH_2 \quad [IIb]$$

wherein R is a hydrogen atom or a methyl group, n is an integer of 1 to 6, a is an integer of 1 to 4, b is an integer of 1 to 3, and c is an integer of 1 to 3;

(C) benzyl(meth)acrylate;

(D) a fluorine-free polymerizable monomer other than components (A) and (C); and (E) a crosslinkable group-containing polymerizable monomer. Here, (meth)acrylate refers to acrylate or methacrylate.

Effect of the Invention

The dispersion stability of an aqueous dispersion forming an emulsion is achieved by controlling the surface charge density of the dispersed particles. Cationic surfactants are generally used in terms of adsorption to fiber, etc. However, in some cases, the surfactant falls out from the surface of the dispersion particles due to the introduction of impurities into the aqueous dispersion, and the aqueous dispersion is poorly dispersed.

In order to solve this problem, in the present invention, a (meth)acrylate having a quaternary ammonium group at its terminal as component (A) was used as a charged polymerizable monomer, and benzyl(meth)acrylate was copolymerized in a fluorine-containing copolymer. As a result, it was found that the use ratio of the charged polymerizable monomer as component (A) was able to be kept low; specifically when the effective range of its use amount was set to be 0.1 to 1.0 wt. % in the copolymer, water- and oil-repellency was kept high even, although the use amount was lower than the 2 wt. % value disclosed in Patent Document 2 mentioned above.

Thus, the dispersion stability of the aqueous dispersion for forming a water- and oil-repellent comprising a fluorine-containing copolymer as an active component can be effectively improved.

EMBODIMENTS FOR CARRYING OUT THE INVENTION

Examples of the (meth)acrylate monomer having a terminal quaternary ammonium group and represented by the general formula [I] include the following monomers, and their commercial products, if available, can be used as they are. Here, examples of the anionic group $Y^-$ include $Cl^-$, $Br^-$, $I^-$, $RSO_4^-$, $H_2PO_4^-$, $RCOO^-$, $ROSO_2^-$, $RSO^-$, $ROPO_4H^-$, $CO_3^-$, $RSO_3^-$ (wherein R is a hydrogen atom, an alkyl group, or an aryl group), and the like.

Methacryloxyethyltrimethylammonium chloride
Methacryloxyaminopropyltrimethylammonium chloride
Methacryloxyethyldimethylethylammonium chloride
Methacryloxyethyldimethyl n-pentylammonium chloride
Methacryloxyethyldimethylbenzylammonium chloride
Methacryloxyaminopropyldimethylbenzylammonium chloride
Methacryloxyethyltrimethylammonium methyl sulfate
Methacryloxyaminopropyltrimethylammonium methyl sulfate
Methacryloxyethyldimethylethylammonium ethyl sulfate
Methacryloxyaminopropyldimethylethylammonium ethyl sulfate
Methacryloxyethyltrimethylammonium p-toluene sulfonate
Methacryloxyaminopropyltrimethylammonium p-toluene sulfonate Such a monomer as component (A) is copolymerized to be a ratio of about 0.1 to 1.0 wt. %, preferably about 0.2 to 0.7 wt. %, in the fluorine-containing copolymer. When the copolymerization ratio is lower than this range, not only the particle size distribution and zeta potential are deteriorated, but also storage stability is completely absent. The same applies when the copolymerization ratio is greater than this range.

Examples of the perfluoroalkylalkyl(meth)acrylate represented by the general formula [IIa] or the polyfluoroalkylalkyl(meth)acrylate thereof include the following (meth)acrylate compounds. Here, m is an integer of 4 to 14.

$CH_2=CHCOOCH_2C_mF_{2m}H$ $CH_2=C(CH_3)COOCH_2C_mF_{2m}H$ $CH_2=CHCOOCH_2C_mF_{2m-1}$ $CH_2=C(CH_3)COOCH_2C_mF_{2m+1}$ $CH_2=CHCOOC_2H_4C_mF_{2m+1}$ $CH_2=C(CH_3)COOC_2H_4C_mF_{2m-1}$ $CH_2=CHCOOC_3H_6C_mF_{2m+1}$ $CH_2=C(CH_3)COOC_3H_6C_mF_{2m-1}$ $CH_2=CHCOOC_4H_8C_mF_{2m+1}$ $CH_2=C(CH_3)COOC_4H_8C_mF_{2m-1}$ $CH_2=CHCOOC_2H_4N(CH_3)SO_2C_mF_{2m+1}$ $CH_2=C(CH_3)COOC_2H_4N(CH_3)SO_2C_mF_{2m-1}$ $CH_2=CHCOOC_2H_4N(C_2H_5)SO_2C_mF_{2m-1}$ $CH_2=C(CH_3)COOC_2H_4N(C_2H_5)SO_2C_mF_{2m+1}$ $CH_2=CHCOOC_2H_4N(C_3H_7)SO_2C_mF_{2m-1}$ $CH_2=C(CH_3)COOC_2H_4N(C_3H_7)SO_2C_mF_{2m+1}$ $CH_2=CHCOOC_2H_4C_{m-3}F_{2m-6}CF(CF_3)_2$ $CH_2=C(CH_3)COOC_2H_4C_{m-3}F_{2m-6}CF(CF_3)_2$

Moreover, the polyfluoroalkyl(meth)acrylate represented by the general formula [IIb] is described in Patent Document 3. Examples thereof include the following compounds:

$C_2F_5(CH_2CF_2)(CF_2CF_2)(CH_2CH_2)OCOCR=CH_2$

$C_2F_5(CH_2CF_2)(CF_2CF_2)_2(CH_2CH_2)OCOCR\!=\!CH_2$ $C_2F_5(CH_2CF_2)_2(CF_2CF_2)(CH_2CH_2)OCOCR\!=\!CH_2$ $C_2F_5(CH_2CF_2)_2(CF_2CF_2)_2(CH_2CH_2)OCOCR\!=\!CH_2$ $C_4F_9(CH_2CF_2)(CF_2CF_2)(CH_2CH_2)OCOCR\!=\!CH_2$ $C_4F_9(CH_2CF_2)_2(CF_2CF_2)(CH_2CH_2)OCOCR\!=\!CH_2$ $C_4F_9(CH_2CF_2)(CF_2CF_2)_2(CH_2CH_2)OCOCR\!=\!CH_2$ $C_4F_9(CH_2CF_2)_2(CF_2CF_2)_2(CH_2CH_2)OCOCR\!=\!CH_2$

Such a perfluoroalkylalkyl(meth)acrylate [IIa] or polyfluoroalkylalkyl(meth)acrylate thereof, or polyfluoroalkyl (meth)acrylate [IIb] as component (B) is copolymerized to be a ratio of about 10 to 80 wt. %, preferably about 25 to 80 wt. %, in the fluorine-containing copolymer. When the copolymerization ratio is lower than this range, required water- and oil-repellency is not exhibited. In contrast, when the copolymerization ratio is greater than this range, the copolymerization ratio of other copolymerization components becomes relatively low, and desired properties derived from these components cannot be obtained.

Benzyl(meth)acrylate, preferably benzyl methacrylate, as component (C) is copolymerized to be a ratio of about 5 to 80 wt. %, preferably about 5 to 50 wt. %, in the fluorine-containing copolymer. When benzyl(meth)acrylate is not copolymerized, the copolymerization ratio of the (meth) acrylate having a terminal quaternary ammonium group as component (A) cannot be reduced.

As the fluorine-free monomer as component (D) other than components (A) and (C), for example, at least one of the following is preferably used in terms of the balance of water- and oil-repellency: acrylic acid esters or methacrylic acid esters esterified with linear or branched alkyl groups having 1 to 18 carbon atoms, such as methyl, ethyl, propyl, isopropyl, n-butyl, n-hexyl, 2-ethylhexyl, n-octyl, lauryl, and stearyl; cycloalkyl groups, such as cyclohexyl; aralkyl groups, such as benzyl; alkoxyalkyl group having 2 to 6 carbon atoms, such as methoxymethyl, 2-methoxyethyl, 2-ethoxyethyl, 2-butoxyethyl, or 3-ethoxypropyl; dialkyl esters of fumaric acid or maleic acid with alkyl groups having 1 to 8 carbon atoms, such as dimethyl, diethyl, dipropyl, dibutyl, or dioctyl; vinyl esters, such as vinyl acetate and vinyl caprylate; and other copolymerizable vinyl compounds, such as styrene, vinyl toluene, α-methylstyrene, vinyl naphthalene, acrylonitrile, methacrylonitrile, vinyl chloride, and vinylidene chloride.

Among these fluorine-free monomers, vinylidene chloride is preferably used. The copolymerization of such a fluorine-free monomer can increase the adhesion to substrates, such as fibers, improve the film forming properties and film strength, and impart excellent water- and oil-repellency. The copolymerization ratio of the fluorine-free monomer is about 1 to 30 wt. %, preferably about 5 to 25 wt. % in the fluorine-containing copolymer.

Examples of the crosslinkable group-containing polymerizable monomer as component (E) include mono- or poly(meth)acrylates of polyols, hydroxyalkyl group-containing (meth)acrylates or vinyl ethers containing an alkyl group having 1 to 4 carbon atoms; amide group-containing (meth)acrylates; epoxy group-containing (meth)acrylates, vinyl ethers or allyl ethers; halogen group-containing (meth) acrylates or vinyl ethers; N-methylol group-containing (meth)acrylates; aziridinyl group-containing (meth)acrylates; carboxyl group-containing polymerizable monomers; diene-based monomers; and the like; polyalkylene glycol mono(meth)acrylate, hydroxyalkyl(meth)acrylate, or methylol group-containing (meth)acrylamide is preferably used.

Examples of mono- or poly(meth)acrylates of polyols include ethylene glycol mono(meth)acrylate, propylene glycol mono(meth)acryl ate, 1,4-butanediol mono(meth)acrylate, 1,6-hexanediol mono(meth)acrylate, 1,9-nonanediol mono(meth)acrylate, neopentyl glycol mono(meth)acrylate, tetraethylene glycol mono(meth)acrylate, polyethylene glycol mono(meth)acrylate, tripropylene glycol mono(meth)acrylate, polypropylene glycol mono(meth)acrylate, dimethyloltricyclodecane monoacrylate, glycerol methacrylate acrylate, 3-acryloyloxyglycerol monomethacrylate, and the like. Among these polyalkylene glycol(meth)acrylates, in the case of a poly(meth)acrylate, all of the polyol groups is not preferably esterified, and at least one hydroxyl group must be present as a crosslinkable group.

Examples of hydroxyalkyl group-containing (meth)acrylates or vinyl ethers include 2-hydroxyethyl(meth)acrylate, 2-hydroxypropyl acrylate, 4-hydroxybutyl acrylate, 2-hydroxy-3-chloropropyl(meth)acrylate, 2-hydroxyethyl vinyl ether, hydroxybutyl vinyl ether, and the like.

Examples of amide group-containing (meth)acrylates include acrylamide, methacrylamide, N-methyl(meth)acrylamide, N-methylol(meth)acrylamide, N-methoxymethyl acrylamide, N-butoxymethyl acrylamide, diacetone acrylamide, and the like.

Examples of epoxy group-containing (meth)acrylates, vinyl ethers, or allyl ethers include glycidyl(meth)acrylate, glycidyl vinyl ether, allyl glycidyl ether, and the like.

Examples of halogen group-containing (meth)acrylates or vinyl ethers include chloroethyl vinyl ether and the like, in addition to 2-hydroxy-3-chloropropyl(meth)acrylate mentioned above.

Examples of N-methylol group-containing (meth)acrylates include N-butoxymethylol(meth)acrylamide and the like, in addition to N-methylol(meth)acrylamide mentioned above.

Examples of aziridinyl group-containing (meth)acrylates include aziridinylethyl(meth)acrylate and the like.

Examples of carboxyl group-containing polymerizable monomers include monoalkyl esters of fumaric acid or maleic acid with alkyl groups having 1 to 8 carbon atoms, such as monomethyl, monoethyl, monopropyl, monobutyl, or monooctyl.

Moreover, examples of diene-based monomers include butadiene, pentadiene, isoprene, chloroprene, and the like.

Among the crosslinkable group-containing monomers listed above, hydrophilic crosslinkable group-containing polymerizable monomers are preferably used. Other examples include polymerizable monomers containing an isocyanate group, a blocked isocyanate group, an alkoxysilyl group, an amino group, an alkoxymethylamide group, a silanol group, an ammonium group, an oxazoline group, an alkenyl group, a sulfonic acid group, or the like.

Such a crosslinkable group-containing monomer is copolymerized to be a ratio of about 0.3 to 30 wt. %, preferably about 1 to 20 wt. %, in the fluorine-containing copolymer. When such a crosslinkable group-containing polymerizable monomer is further copolymerized as an active component of the water- and oil-repellency, fluorine-containing copolymer, the adhesion to substrates, such as fiber, is enhanced, and the durability, washing resistance, dry-cleaning resistance, etc., of the water- and oil-repellent are improved.

The copolymerization reaction of these polymerizable monomers is performed by an emulsion polymerization method in the presence of a nonionic surfactant, preferably a polyethylene oxide-based nonionic surfactant. Examples of polyethylene oxide-based nonionic surfactants include condensation reaction products of polyethylene oxide with hexylphenol, octylphenol, nonylphenol, polycyclic phenyl ether, hexadecanol, oleic acid, $C_{12}$-$C_{18}$ alkylamine, sorbitan monofatty acid, or the like; preferably, a condensation reaction product of polyethylene oxide with polycyclic phenyl ether is used. The nonionic surfactant is used at a ratio of about 1 to 20 wt. % based on the total amount of the emulsion polymerization reaction system, including water.

The copolymerization reaction of a fluorine-containing monomer using such an emulsifier is performed in the presence of an inorganic peroxide, azo compound, organic peroxide, or the like, preferably using, as a catalyst, a water-soluble inorganic peroxide, such as ammonium persulfate, sodium persulfate, or potassium persulfate; or a redox system of such a water-soluble inorganic peroxide and a reducing agent, such as bisulfite (e.g., sodium hydrogen sulfite or sodium metabisulfite), thiosulfate, hydrazine, or azodicarboxylate. In this case, in order to adjust the pH in the polymerization system, NaOH, an electrolyte substance having a buffering capacity, such as phosphate ($Na_2HPO_4$, $NaH_2PO_4$, $KH_2PO_4$, etc.) or borate ($Na_2B_2O_7$, etc.), or the like may be added and used.

A chain transfer agent can also be used in the copolymerization reaction. Examples of chain transfer agents include esters, such as ethyl malonate and ethyl acetate; ethers, such as dimethyl ether and methyl tert-butyl ether; alcohols, such as methanol, ethanol, and isopropanol; ketones, such as acetone, methyl ethyl ketone, and methyl isobutyl ketone; $C_1$-$C_5$ alkanes; halogenated hydrocarbons, such as chloroform, carbon tetrachloride, and dichloroethane; and the like.

The copolymerization reaction is performed using about 0.1 to 10 wt. %, preferably about 0.5 to 7 wt. %, more preferably about 0.5 to 5 wt. %, of polymerization initiator based on the fluorine-containing polymer to be formed, at about 0 to 100° C., preferably about 5 to 80° C., for about 1 to 48 hours under pressure conditions of about 0.1 to 10 MPa, preferably about 0.2 to 5 MPa. The polymerization initiator may be added again in the process of the polymerization reaction, if necessary. As a result of the copolymerization reaction, an aqueous dispersion (aqueous emulsion) having a solid matters content of about 15 to 35 wt. % is formed.

The thus-obtained aqueous dispersion as a stock solution is diluted with water, preferably ion exchange water, to a solid matters content of about 0.1 to 10 wt. %, and then effectively applied to fiber, cloth, fabric, paper, film, carpet, or textile products made of filament, yarn, fiber, etc., as a water- and oil-repellent. As the application method, coating, dipping, spraying, padding, roll coating, or a combination of these methods is generally used. For example, the aqueous dispersion is used as a pad bath having a solid matters content of about 0.1 to 10 wt. %. A material to be treated is padded in the pad bath, and the excessive liquid is removed by squeeze rolls, followed by drying, so that the amount of the fluorine-containing copolymer attached to the material is about 0.01 to 10 wt. %. Subsequently, drying is generally carried out at a temperature of about 80 to 120° C. for about 1 minute to about 2 hours, although this depends on the type of material to be treated. Thereafter, curing is performed at about 150 to 180° C. for about 1 to 3 minutes, preferably at about 150 to 170° C. for about 1 to 3 minutes. Thus, the water- and oil-repellent treatment is completed.

Because the copolymerization reaction is performed almost quantitatively, the weight ratio of each charged polymerizable monomer is almost equal to the copolymerization ratio of the obtained fluorine-containing copolymer. The obtained fluorine copolymers have a weight average molecular weight Mw of about 2,000 to 20,000,000.

EXAMPLES

The following describes the present invention with reference to Examples.

Example 1

| | |
|---|---|
| 2-(n-perfluorohexyl)ethyl methacrylate [FAMAC-6] | 87.2 g (63.9%) |
| Benzyl methacrylate [BzMA] | 22.4 g (16.4%) |
| 2-Hydroxyethyl methacrylate [2HEA] | 5.6 g (3.8%) |
| Polyethylene glycol (n: 4) monomethacrylate [PE-200] (PE-200, produced by NOF Corporation) | 4.2 g (3.1%) |
| Methacryloxyethyltrimethylammonium chloride [DMACMA] | 0.3 g (0.2%) |
| Lauryl mercaptan (chain transfer agent) [n-DMC] | 0.5 g |
| Polyoxyethylene polycyclic phenyl ether (surfactant) [N-740] (Newcol-740, produced by Nippon Nyukazai Co., Ltd.) | 7.0 g |
| Hexylene glycol (solvent) [HG] | 35.0 g |
| Ion exchange water | 258.5 g |

The above components were placed in a glass reactor having an internal capacity of 1 L, and mixed. The mixture was further emulsified and mixed using a high pressure homogenizer.

After the air in the reactor was replaced by nitrogen gas for 30 minutes, the internal temperature of the reactor was gradually increased. When the temperature reached 40° C., the following components were supplied (500.0 g in total, including the total amount (318.2 g) of ion exchange water).

| | |
|---|---|
| Vinylidene chloride [VDC] | 11.2 g (8.2%) |
| N-methylolacrylamide [NMAM] (as a solution dissolved in 29.3 g of ion exchange water) | 5.6 g (4.1%) |
| 2,2'-Azobis(2-amidinopropane)•dihydrochloride (polymerization initiator) [NC-32P] (as a solution dissolved in 30.4 g of ion exchange water) | 2.8 g |

Further, the internal temperature was gradually increased to 70° C. While maintaining this temperature, the mixture was reacted for 4 hours.

After completion of the reaction, the mixture was cooled, thereby obtaining 490 g of an aqueous dispersion having a solid matters content of 24.8 wt. %. The particle diameter and average zeta potential of the aqueous dispersion were measured, and the storage stability over time at 40° C. was evaluated.

Particle diameter: Using a particle size analyzer MICROTRAC UPA 150, the particle diameter at a cumulative frequency of 10%, 50%, or 100% was measured in ascending order of particle diameter (50% particle diameter represents the average particle diameter).

Measurement of average zeta potential: The zeta potential was measured 5 times using a measuring instrument (Zeta-PLAS, produced by Nikkiso Co., Ltd.) under the following conditions: measurement temperature: 25° C., measurement pH: 1 to 7, and measurement concentration: 1 mg/ml. Then, the average of the measured values was determined.

Evaluation of storage stability over time: The aqueous dispersion (50 g) was placed in screw pipes (shallow conical-shaped pipes) having an internal capacity of 110 ml, and the open end part of each pipe was sealed with a PTFE film. Then, the pipes were left in an oven maintained at 40° C. for one week, two weeks, three weeks, four weeks, and six months. After the specified time elapsed, the screw pipes were inclined, and the occurrence state of precipitation on the bottom surface was visually evaluated according to the following criteria:

Rank A: Almost no precipitate
Rank B: A small amount of precipitate found in a portion of the bottom surface
Rank C: Slight precipitate found on almost the whole bottom surface, but the entire liquid surface can be viewed from the bottom surface
Rank D: Precipitate found on the whole bottom surface, and the entire liquid surface cannot be viewed from the bottom surface
Rank E: A large amount of precipitate found, and layer separation occurs Examples 2 to 4 and Comparative Examples 1 to 3

In Example 1, the type and used amount of copolymerization components (A) to (D) were changed in various ways.

DTFAC-103:
3,3,4,4,5,5,6,6,7,7,9,9,10,10,11,11,12,12,12-nonadecafluorodecyl acrylate $C_4F_9(CH_2CF_2)(CF_2CF_2)_2(CH_2CH_2)OCOCH=CH_2$ FAAC-Mix: 2-(perfluoroalkyl)ethyl methacrylate
Amount of perfluoroalkyl: a mixed group of 6% of $C_6$, 52% of $C_8$, 24% of $C_{10}$, 7% of $C_{12}$, and 2% of $C_{14}$ (total: 91%); average number of carbon atoms: 8.8

STAC: stearyl acrylate

The following table shows the amounts of the copolymerization components (g and wt. % shown in parentheses) and the measurement results. The type and used amount of chain transfer agent (n-DMC), surfactant (N-740), polymerization initiator (NC-32P), and organic solvent (HG), the polymerization time (4 hours), and the polymerization temperature (70° C.) are the same as those of Example 1. Moreover, the amount of ion exchange water was adjusted so that the total amount of all charged components, including water, was 500 g.

TABLE

| | Ex. 1 | Ex. 2 | Ex. 3 | Ex. 4 | Comp. Ex. 1 | Comp. Ex. 2 | Comp. Ex. 3 |
|---|---|---|---|---|---|---|---|
| [Amount of copolymerization components] | | | | | | | |
| Component (A): | | | | | | | |
| DMACMA | 0.3 (0.2) | 1.0 (0.7) | 0.3 (0.2) | 0.3 (0.2) | — | 10.0 (6.8) | 0.3 (0.2) |
| Component (B): | | | | | | | |
| FAMAC-6 | 87.2 (63.9) | 87.2 (63.6) | — | — | 87.2 (64.1) | 87.2 (59.6) | 87.2 (63.9) |
| DTFAC-103 | — | — | 87.2 (63.9) | — | — | — | — |
| FAAC-Mix | — | — | — | 87.2 (63.9) | — | — | — |
| Component (C): | | | | | | | |
| BzMA | 22.4 (16.4) | 22.4 (16.3) | 22.4 (16.4) | 22.4 (16.4) | 22.4 (16.4) | 22.4 (15.3) | — |
| Component (D): | | | | | | | |
| VDC | 11.2 (8.2) | 11.2 (8.2) | 11.2 (8.2) | 11.2 (8.2) | 11.2 (8.2) | 11.2 (7.7) | — |
| STAC | — | — | — | — | — | — | 33.6 (24.6) |
| Component (E): | | | | | | | |
| PE-200 | 4.2 (3.1) | 4.2 (3.1) | 4.2 (3.1) | 4.2 (3.1) | 4.2 (3.1) | 4.2 (2.9) | 4.2 (3.1) |
| 2HEA | 5.6 (4.1) | 5.6 (4.1) | 5.6 (4.1) | 5.6 (4.1) | 5.6 (4.1) | 5.6 (3.8) | 5.6 (4.1) |
| NMAM | 5.6 (4.1) | 5.6 (4.1) | 5.6 (4.1) | 5.6 (4.1) | 5.6 (4.1) | 5.6 (3.8) | 5.6 (4.1) |
| [Aqueous dispersion] | | | | | | | |
| Recovered amount (g) | 490 | 491 | 492 | 492 | 491 | 491 | 486 |
| Solid matters content (wt. %) | 24.8 | 25.7 | 23.7 | 23.7 | 25.2 | 27.3 | 24.9 |
| [Measurement results] Particle diameter (nm) | | | | | | | |
| 10% | 59 | 59 | 89 | 89 | 102 | 102 | 63 |
| 50% | 96 | 95 | 146 | 146 | 138 | 138 | 94 |
| 100% | 193 | 223 | 208 | 208 | 196 | 196 | 142 |
| Zeta potential (mV) | 29 | 38 | 30 | 29 | 5 | 2 | 30 |

| | Ex. 1 | Ex. 2 | Ex. 3 | Ex. 4 | Comp. Ex. 1 | Comp. Ex. 2 | Comp. Ex. 3 |
|---|---|---|---|---|---|---|---|
| Storage stability | | | | | | | |
| 1 week later | B | B | B | B | E | E | B |
| 2 weeks later | B | B | B | B | | | B |
| 3 weeks later | B | B | B | B | | | B |
| 4 weeks later | B | C | B | B | | | C |
| 6 months later | B | D | B | C | | | D |

The invention claimed is:

1. An aqueous dispersion of a fluorine-containing copolymer comprising, as copolymerization units, (A) a (meth)acrylate represented by the general formula:

$$[CH_2{=}CHRCOO(NH)_rR_1NR_2R_3R_4]^+Y^-  \quad \text{[I]}$$

wherein R is a hydrogen atom or a methyl group; $R_1$ is a linear, branched, or alicyclic alkylene group having 1 to 30 carbon atoms or a phenylene group; $R_2$, $R_3$, and $R_4$ are the same or different and each is a linear, branched, or alicyclic alkyl group having 1 to 30 carbon atoms or an aralkyl group; r is 0 or 1; and $Y^-$ is an anionic group;

(B)

a perfluoroalkylalkyl(meth)acrylate represented by the general formula:

$$C_mF_{2m+1}C_pH_{2p}(NR'SO_2)_qOCOCR{=}CH_2  \quad \text{[IIa]}$$

wherein R is a hydrogen atom or a methyl group, R' is an alkyl group having 1 to 5 carbon atoms, m is an integer of 4 to 14, p is an integer of 1 to 4, and q is 0 or 1;

a polyfluoroalkylalkyl(meth)acrylate which is prepared by replacing some of the fluorine atoms in the perfluoroalkyl group in the above perfluoroalkylalkyl(meth)acrylate with hydrogen atoms; or a polyfluoroalkyl(meth)acrylate represented by the general formula:

$$C_nF_{2n+1}(CH_2CF_2)_a(CF_2CF_2)_b(CH_2CH_2)_c OCOCR{=}CH_2  \quad \text{[IIb]}$$

wherein R is a hydrogen atom or a methyl group, n is an integer of 1 to 6, a is an integer of 1 to 4, b is an integer of 1 to 3, and c is an integer of 1 to 3;

(C) benzyl(meth)acrylate;

(D) a fluorine-free polymerizable monomer other than components (A) and (C); and (E) a crosslinkable group-containing polymerizable monomer, wherein 0.1 to 1.0 wt. % of component (A), 10 to 80 wt. % of component (B), 5 to 80 wt. % of component (C), 1 to 30 wt. % of component (D), and 0.3 to 30 wt. % of component (E), each in the fluorine-containing copolymer, are copolymerized using a water-soluble polymerization initiator.

2. The aqueous dispersion of the fluorine-containing copolymer according to claim 1, wherein the fluorine-free polymerizable monomer as component (D) in the fluorine-containing copolymer is vinylidene chloride.

3. The aqueous dispersion of the fluorine-containing copolymer according to claim 1, wherein the crosslinkable group-containing polymerizable monomer as component (E) in the fluorine-containing copolymer is polyalkylene glycol mono(meth)acrylate, hydroxyalkyl(meth)acrylate, or methylol group-containing (meth)acrylamide.

4. A water- and oil-repellent which is prepared by further diluting the aqueous dispersion of the fluorine-containing copolymer according to claim 1, with a water-based medium to a solid matters content of 0.1 to 10 wt. %.

5. A fluorine-containing copolymer comprising, as copolymerization units, (A) a (meth)acrylate represented by the general formula:

$$[CH_2{=}CHRCOO(NH)_rR_1NR_2R_3R_4]^+Y^-  \quad \text{[I]}$$

wherein R is a hydrogen atom or a methyl group; $R_1$ is a linear, branched, or alicyclic alkylene group having 1 to 30 carbon atoms or a phenylene group; $R_2$, $R_3$, and $R_4$ are the same or different and each is a linear, branched, or alicyclic alkyl group having 1 to 30 carbon atoms or an aralkyl group; r is 0 or 1; and $Y^-$ is an anionic group;

(B)

a perfluoroalkylalkyl(meth)acrylate represented by the general formula:

$$C_mF_{2m+1}C_pH_{2p}(NR'SO_2)_qOCOCR{=}CH_2  \quad \text{[IIa]}$$

wherein R is a hydrogen atom or a methyl group, R' is an alkyl group having 1 to 5 carbon atoms, m is an integer of 4 to 14, p is an integer of 1 to 4, and q is 0 or 1;

a polyfluoroalkylalkyl(meth)acrylate which is prepared by replacing some of the fluorine atoms in the perfluoroalkyl group in the perfluoroalkylalkyl(meth)acrylate with hydrogen atoms; or a polyfluoroalkyl(meth)acrylate represented by the general formula:

$$C_nF_{2n+1}(CH_2CF_2)_a(CF_2CF_2)_b(CH_2CH_2)_c OCOCR{=}CH_2  \quad \text{[IIb]}$$

wherein R is a hydrogen atom or a methyl group, n is an integer of 1 to 6, a is an integer of 1 to 4, b is an integer of 1 to 3, and c is an integer of 1 to 3;

(C) benzyl(meth)acrylate;

(D) a fluorine-free polymerizable monomer other than components (A) and (C); and (E) a crosslinkable group-containing polymerizable monomer, wherein 0.1 to 1.0 wt. % of component (A), 10 to 80 wt. % of component (B), 5 to 80 wt. % of component (C), 1 to 30 wt. % of component (D), and 0.3 to 30 wt. % of component (E) are copolymerized using a water-soluble polymerization initiator.

6. A water- and oil-repellent which is prepared by further diluting the aqueous dispersion of the fluorine-containing copolymer B according to claim 1, with a water-based medium to a solid matters content of 0.1 to 10 wt. %.

7. A water- and oil-repellent which is prepared by further diluting the aqueous dispersion of the fluorine-containing copolymer according to claim 2, with a water-based medium to a solid matters content of 0.1 to 10 wt. %.

8. A water- and oil-repellent which is prepared by further diluting the aqueous dispersion of the fluorine-containing copolymer according to claim 3, with a water-based medium to a solid matters content of 0.1 to 10 wt. %.

* * * * *